United States Patent [19]

Ebell

[11] Patent Number: 4,844,722

[45] Date of Patent: Jul. 4, 1989

[54] AIR POLLUTION PREVENTION DEVICE

[76] Inventor: Rudolph F. Ebell, 515 South Washington St., Denver, Colo. 80209

[21] Appl. No.: 222,503

[22] Filed: Jul. 21, 1988

[51] Int. Cl.⁴ .............................................. B01D 53/14
[52] U.S. Cl. ............................................. 55/90; 55/95; 55/234; 55/248; 55/256; 55/DIG. 30; 60/310; 261/96
[58] Field of Search ............... 55/90, 95, 233, 234, 55/248, 256, DIG. 30; 60/310; 261/96

[56] References Cited

U.S. PATENT DOCUMENTS

| | | | |
|---|---|---|---|
| 1,114,876 | 10/1974 | Moodspeed | 55/DIG. 30 X |
| 1,402,814 | 1/1922 | Wachtel | 55/233 |
| 3,563,029 | 2/1971 | Lowes | 60/30 |
| 3,712,029 | 1/1973 | Charlton | 55/233 X |
| 3,717,979 | 2/1973 | Waters | 55/233 |
| 3,853,484 | 12/1974 | Sudan et al. | 60/310 X |
| 3,922,152 | 11/1975 | Kookoothakis | 55/256 X |
| 3,984,219 | 10/1976 | Huang | 55/227 |
| 4,137,715 | 2/1979 | Tung-Lung | 60/310 |
| 4,282,017 | 8/1981 | Chen | 55/247 |

Primary Examiner—Charles Hart
Attorney, Agent, or Firm—Norvell E. Von Behren

[57] ABSTRACT

An air pollution prevention device that is designed in the preferred embodiment to operate downstream from an existing muffler. The device comprises an oil filled lower chamber with turbulence causing means such as plastic netting through which the exhaust gasses pass. Two upper chambers having turbulence causing means such as steel wool receive the gasses and oil from the lower chamber. The particulate matter in the gasses is coated with oil and being heavier than the exhaust gas will drop out of the exhaust gas and run into the lower oil chamber where it can be periodically removed along with the oil when clean oil is added to the device.

20 Claims, 2 Drawing Sheets

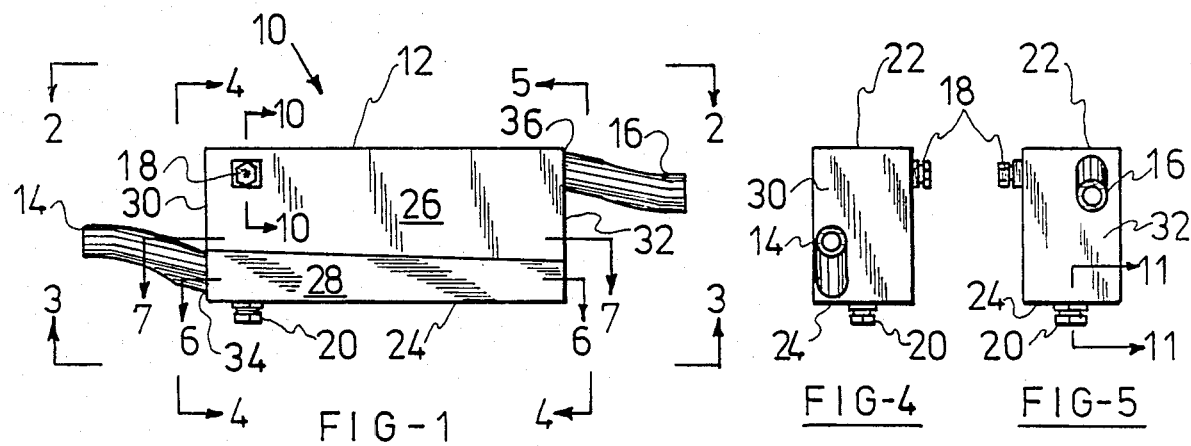
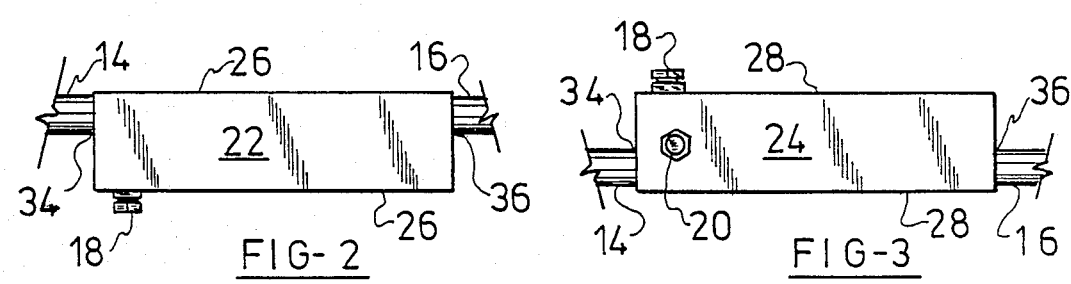
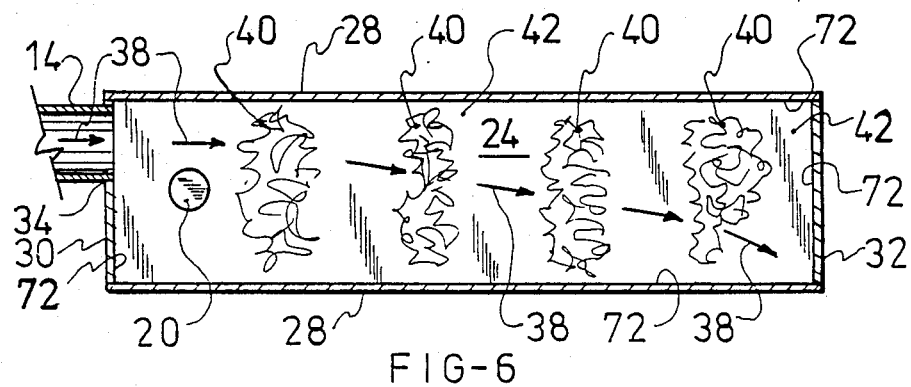
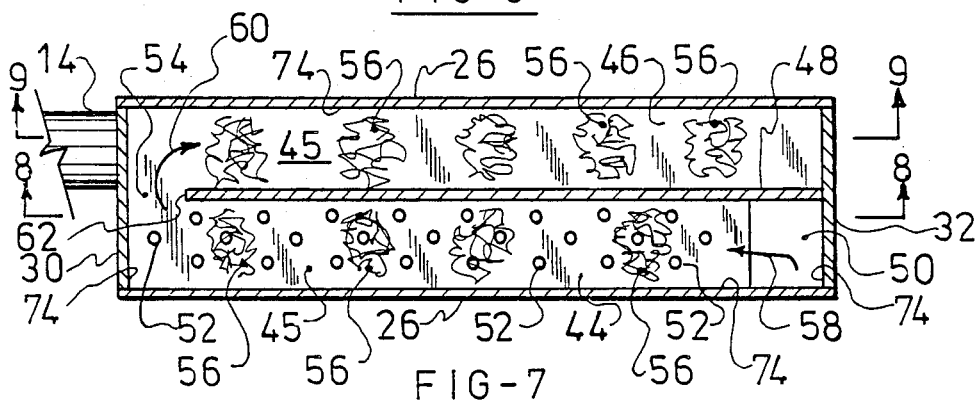
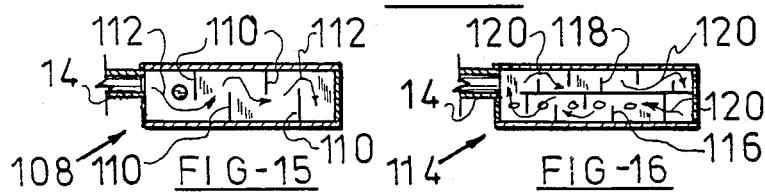

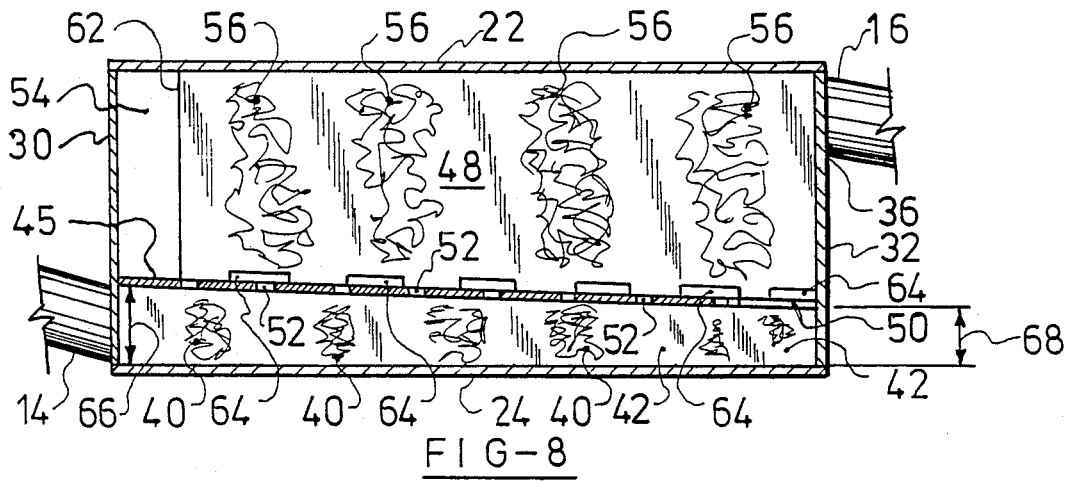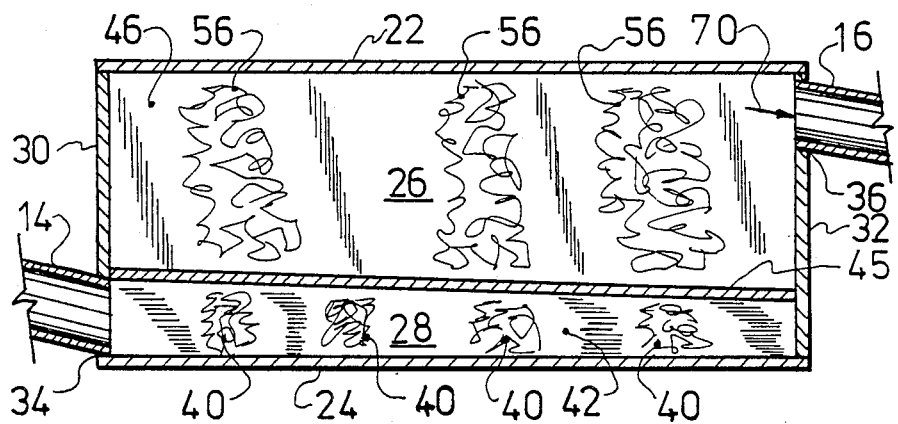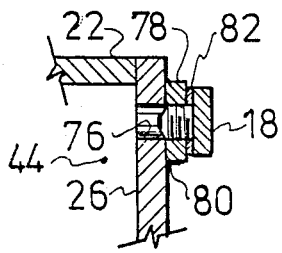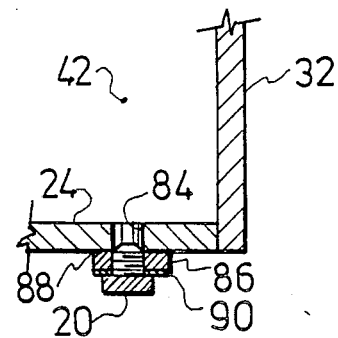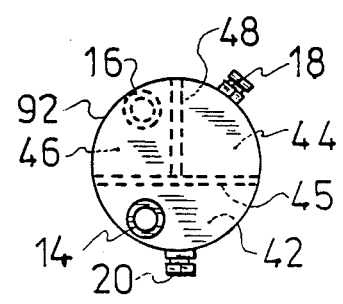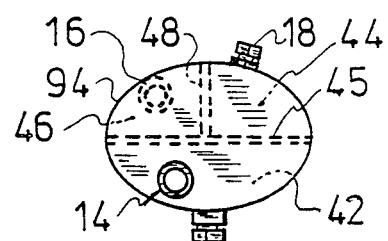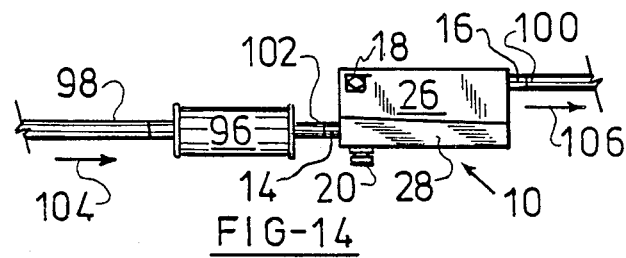

AIR POLLUTION PREVENTION DEVICE

BACKGROUND OF THE INVENTION

This invention relates to an air pollution prevention device in general and in particular to a new and novel device for use in combination with an internal combustion engine exhaust system to remove dangerous pollutants from the exhaust.

It is known that air pollution is a very serious problem in virtually every major city in the world having large quantities of automotive vehicles traveling throughout the city in various commercial and personal activities. It is generally believed that a large portion of the air pollution comes from these automotive vehicles and the worst pollutants are believed to be carbon monoxide, hydrocarbons, nitrogen oxides and sulfur oxides among others. The particulate matter from carbon in exhaust gasses contributes to the well known "Brown Cloud" which can be seen floating above the cities. While it is important to try to remove the particulate matter to minimize the appearance of the "Brown Cloud," it is also very important to diminish and try to eliminate the worst pollutants which can be injurious to a person's health.

In addition it is known that the pollutants floating in the air can react with the sun's rays to form photochemical smog which can also be injurious to the health of the population in the city.

Various types of air pollution prevention devices have been designed as typified by the U.S. Pat. No. 4,282,017, issued Aug. 4, 1981 to Hsi-Chi Chen which mixes water from a collateral water tank with exhaust gas in various chambers to try to minimize dirty smoke and also to eliminate the need for a separate muffler.

A similar type device is taught in the U.S. Pat. No. 4,137,715, issued on Feb. 5, 1979 to Ho Tung-lung. This invention uses water from a self-contained chamber to dissolve carbides and impurities in the waste gas. The water is also atomized through a Venturi nozzle to disperse into a fog to an evaporation chamber and a releasing chamber. This device, like the device of U.S. Pat. No. 4,282,017, claims to absorb exhaust noises also, thereby eliminating the need for a conventional muffler.

Another attempt at air pollution elimination is taught in the U.S. Pat. No. 3,984,219, issued on Oct. 5, 1976 to Ming-Dao Huang. This attempted solution to the basic problem uses a combination of water and a series of filter elements made of a porous plastic material such as polyurethane foam in a central tank area. The inventor also claims to be able to eliminate noise to a great extent and therefore would probably contemplate then the elimination also of the conventional muffler.

Various other attempts have been tried with other combinations as taught in the U.S. Pat. No. 3,717,979, issued Feb. 27, 1973 to Louis J. Gagliardi. This concept uses a horizontal pipe filled with water which is hung on the rear bumper of a dual-exhaust system. The exhaust then passes through a pair of vertical tubes filled with a filter medium such as charcoal, leather pieces or other materials. An air activated propeller acts to retain the gasses in the filter media.

A combination muffler and a pollution device using baffled chambers in combination with a liquid flux composition for lead trapping is taught in the U.S. Pat. No. 3,563,019, issued Feb. 16, 1971 to F. J. Lowes. The flux material used is preferably a mixture of sodium hydroxide and potassium hydroxide which are solid materials at room temperature and form liquid compositions on contact with high temperature exhaust gasses in the mufflers.

SUMMARY OF THE INVENTION

From the foregoing representation of prior art devices, it can be seen that most attempt to eliminate the need for a conventional muffler by combining, in the pollution device, the muffler function of minimizing noises. The applicant's device is designed to work in combination with an existing muffler and to serve primarily as a pollution prevention device and not as a muffler. However, some noise muffling may be obtained because of the device's unique construction as will be readily seen.

The applicant's solution to the perplexing problem of internal combustion exhaust pollutants is to provide an elongated container for mounting downstream from an existing muffler. The container has formed therein at least three inner connecting chambers, with two of the chambers being formed over a lower oil containing chamber. Turbulence creating means such as packing material is positioned in the three chambers to increase the turbulence of the exhaust gas inside the chambers. The intake gas churns through the lower oil filled chambers to coat particulate matter with the oil making it heavier and less inclined to pass out of the device.

The novel positioning of the chambers causes the coated exhaust gas to change directions at least twice, thereby driving more of the oil coated exhaust gas downwardly in the lower chamber which forms a sump of oil and particulate matter of hydrocarbons. The spent oil with particulate matter is then drained periodically from the device and new oil is put into the device as needed.

Accordingly it is an object and advantage of the invention to provide a pollution device that may be retro-fitted on existing cars and which uses only oil or other liquids in the device in combination with the internal chambers and turbulence causing means to achieve the desired effect.

Another object and advantage of the invention is to provide a simple and inexpensive device which needs no external parts or attachments to accomplish the pollution control.

A further object and advantage of the subject invention is to provide a new and novel pollution device that does not corrode, thereby resulting in a long-lasting and valuable attachment that accomplishes surprisingly good results with little effort.

These and other objects will become apparent after a study of the drawings and a review of the following Description of the Preferred Embodiment which is given by way of illustration only.

BRIEF DESCRIPTION OF THE DRAWINGS

FIG. 1 is a side view of the applicant's air pollution prevention device.

FIG. 2 is a top view, taken along line 2—2 of FIG. 1.

FIG. 3 is a bottom view, taken along line 3—3 of FIG. 1.

FIG. 4 is one end view, taken along line 4—4 of FIG. 1.

FIG. 5 is an opposite end view, taken along line 5—5 of FIG. 1.

FIG. 6 is a cross-sectional view, taken along line 6—6 of FIG. 1, showing the lower oil chamber inside the device.

FIG. 7 is a cross-sectional view, taken along line 7—7 of FIG. 1, showing the two upper chambers inside the device.

FIG. 8 is a cross-sectional view, taken along line 8—8 of FIG. 7, showing the lower oil chamber and one of the upper connecting chambers.

FIG. 9 is a cross-sectional view, taken along line 9—9 of FIG. 7, showing the lower oil chamber and the other upper connecting chamber.

FIG. 10 is a cross-sectional view, taken along line 10—10 of FIG. 1, showing the filler plug for filling oil into the device.

FIG. 11 is a cross-sectional view, taken along line 11—11 of FIG. 5, showing the drain plug for draining oil and particulate matter from the device.

FIG. 12 is an end view of a modification of the applicant's device formed in a round configuration.

FIG. 13 is an end view of a further modification of the applicant's device formed in an oval configuration.

FIG. 14 is a schematic representation showing the applicant's device used in proximity to a muffler in an internal combustion exhaust system.

FIG. 15 is a cross-sectional view, taken along line 6—6 of FIG. 1 showing a modification to the applicant's device with a plurality of inner baffles fixedly attached to the lower chamber in place of packing material.

FIG. 16 is a cross-sectional view, taken along line 7—7 of FIG. 1 showing a modification of the applicant's device with a plurality of inner baffles being fixedly attached to the upper chambers in place of packing material.

DESCRIPTION OF THE PREFERRED EMBODIMENT

Referring now to the drawings in general and in particular to FIG. 1 of the drawings, there is shown the applicant's new and novel air pollution device generally by the numeral 10 which comprises a rectangular outer shell 12 having an intake pipe 14 welded at 34 thereto at one end and an exhaust pipe 16 welded at 36 at the other end. An oil filler plug 18 is used to fill oil or other liquids into the device and the oil drain plug 20 is used to drain oil and waste particulate matter from exhaust gas passing through the device.

The generally rectangular shell 12 is formed by welding together a top panel 22 and a bottom panel 24 to a pair of side panels 26 and 28 on each side of the container. End panels 30 and 32 are also welded to the shell to completely enclose the inside of the device 10. The relative positions of the intake pipe 14 and the exhaust pipe 16, as well as the positions of the filler plug 18 and the drain plug 20, can be seen by referring to top and bottom views shown in FIGS. 2 and 3 as well as the end views shown in FIGS. 4 and 5.

In the preferred embodiment shown, the device would be constructed of 16 gauge steel and may also be constructed of other materials and in other general shapes within the spirit and scope of the invention.

Referring now to FIGS. 6 and 7 there will now be described in detail the construction of the inside of the applicant's device. The elongated container 10 is formed with at least three inner connecting chambers with two upper chambers being positioned over a lower chamber. The chambers serve to control the direction of exhaust gasses flowing through the device.

FIG. 6 is a cross-sectional view taken through line 6—6 of FIG. 1 and shows in detail the lower oil chamber 42 into which the exhaust gas passes, as shown by the arrows 38. The lower oil chamber 42 has been packed with turbulence creating means 40 such as plastic netting material or other materials that will allow the exhaust gas to pass through in a turbulent manner. The lower oil chamber has also been filled with a lightweight oil such as 20 weight prior to using the device.

In a device formed as shown, approximately three quarts of oil would be needed to fill into the lower oil chamber 42 if the container were sized to be approximately 19″ long by 5″ wide by 8″ high. From the entrance slope downwardly on the intake pipe 14, as seen in FIG. 1, into the lower oil chamber 42, it can be seen that the incoming exhaust gasses are driven into the oil in the oil chamber 42 and will then be coated with oil as the oil churns around from the action of the turbulence creating means. The first velocity on starting the internal combustion will also push oil up into the first upper chamber 44 which is shown in detail in FIG. 7. The cross-sectional view taken through lines 7—7 of FIG. 1 shows the upper chamber area which is divided into a first upper chamber 44 and a second upper chamber 46. The upper chamber 44 and 46 are formed by a generally horizontal plate 45 which is fixedly attached by welding to the inside of the container and to the upper side panels 26 and the lower side panels 28.

The generally horizontal plate 45 is welded in place above the intake pipe 14 and is formed with a square opening 50 in one end to allow passage of the oil and oil coated particulate matter out of the lower oil chamber 42 into the first upper chamber 44 as shown by the arrow 58 in FIG. 7 which represents the exhaust gas flow of the exhaust gas 38 coming from the lower oil chamber 42 and turning upwardly and reversing direction by 180°.

The upper chambers 44 and 46 are formed by a central partition baffle plate 48 which is welded to the end panel 32 and to the generally horizontal plate 45. The central partition baffle plate 48 is sized of a shorter length by 1½″ to 2″ than the length of the side panels 26 and 28 so that a vertical opening 54 is formed in the left side of the device. The vertical opening 54 permits the exhaust gasses 58 to pass into the second upper chamber 46 around the edge 62 of the baffle as shown by the arrow 60 in FIG. 7 where the gasses again reverse direction into the second upper chamber 46. Thereafter the gasses rise into the upper portion of the second upper chamber and pass out of the exhaust pipe 16.

The generally horizontal plate 45 is formed with a plurality of drain holes 52 to permit oil and oil coated particulate matter to flow back into the lower oil chamber 42. The generally horizontal plate 45 is also sloped approximately ¼″ as shown in FIG. 8 to permit oil also to drain into the horizontal square exhaust gas opening 50 into the lower oil chamber. The central vertical partition baffle plate 48 also has formed therein a plurality of drain holes or notches 64, as seen in FIG. 8, at the bottom thereof, to permit oil to drain from the second upper chamber 46 into the first upper chamber 44 and then into the lower oil chamber 42 through the oil drain holes 52 and the horizontal opening 50.

In the preferred embodiment shown, the oil drain holes 52 would be approximately ¼″ in diameter and the oil drain notches 64 would be approximately 1½″ long by about ¼″ to ½″ in height. The horizontal square opening 50 would be sized to be approximately 2″ square and the vertical opening 54 between the two upper chambers 44 and 46 would be approximately 1½ wide by 4" in height.

In the preferred embodiment shown, the upper chambers 44 and 46 would also be packed with a quantity of turbulence creating means 56 in the form of steel wool or some other suitable material that will permit the exhaust gasses to pass through but will also create a turbulence in the gas flow.

Referring now to FIGS. 8 and 9 there are shown cross-sectional views, taken through lines 8—8 and 9—9 of FIG. 7 respectively showing in more detail the position of the two upper chambers 44 and 46 above the lower oil chamber 42. The slope of the generally horizontal plate 45 can also be seen wherein the arrow dimension 66 would be approximately 2" while the arrow dimension 68 would be approximately 1¼". It can also be seen in FIGS. 7 and 9 how the exhaust gasses 60 turn around the edge 62 of the vertical baffle plate 48 and through the steel wool turbulence causing means 56 and pass out of the second upper chamber 46 through the exhaust pipe 16 as shown by the arrow 70. The steel wool turbulence creating means 56 in the second upper chamber 46 also prevents oil from passing out of the device at the exhaust pipe 16 and helps to contain the oil in the device where it can ultimately be drained back into the lower oil chamber 42 and ultimately discarded out of the oil drain plug 20.

The insides 72 of the lower oil chamber 42 we well as the insides 74 of the upper chamber 44 and 46 as well as the central partition baffle plate 48 may also be coated with a teflon coating to prevent the oil and exhaust gasses inside the device from corroding the inside of the device.

Referring now to FIGS. 10 and 11 there are shown details of the oil filler plug 18 and the oil drain plug 20. A filler hole 76 has a threaded filler nut 78 welded thereto at 80 after the nut 78 is positioned above the hole 76. The oil filler plug 18 can then be screwed into the filler plug nut 78 after a washer gasket 82 is positioned over the threads. A similar structure is detailed in FIG. 11 where an oil drain hole 84 is formed in the bottom panel 24 and an oil drain nut 86 is welded at 88 after being positioned over the oil drain hole 84. Thereafter the oil drain plug 20 may be screwed into the oil drain nut after a washer gasket 90 is positioned over the threads.

Referring now to FIGS. 12 and 13 there are shown two end views of modifications of the air pollution control device shown by the numeral 92 in FIG. 12 and the numeral 94 in FIG. 13. In the modification of FIG. 12 the basic device would be formed in a generally shaped circular configuration with the same inner lower oil chamber 42 and the two upper chambers 44 and 46 separated by the plates 45 and 48 shown as dashed lines in FIG. 12.

Similarly the modification 94 is constructed in a generally oval configuration as shown in FIG. 13 also with an inner lower oil chamber 42 and two upper chambers 44 and 46 formed by the plates 45 and 48 as shown by the dashed lines. The intake pipe 14 and exhaust pipe 16 would also be welded to these modified forms of the invention and the insides of the modified containers would also be packed with turbulence creating means 40 and 56 in the form of plastic netting and steel wool respectively, similar to the preferred embodiment. The rest of the inside construction of the modified forms of the basic invention would also be similar to the preferred embodiment detailed hereinbefore.

FIG. 14 shows a schematic representation of the new and novel device of the applicant's design showing how the device 10 would be positioned downstream from an existing muffler 96 connected to the exhaust manifold or pipes 98 of a conventional internal combustion exhaust system. The applicant's device 10 would be connected at 14 to a connecting pipe 102 and to the muffler 96 and would be connected at 16 to the tail pipe 100. Exhaust gasses would then enter into the exhaust system at 104 flowing through the existing muffler 96 into the applicant's air pollution control device 10 and out at 106 into the atmosphere.

It is believed that the applicant's novel device 10 functions by the force of the existing internal combustion engine to take the initial first velocity on start up to create an initial high force to cause the exhaust gasses to force their way into the oil filled lower oil chamber 42 creating turbulence in the oil aided by the turbulence creating means 40 in the form of the plastic netting material. This turbulence in the oil then serves to coat particulate matter with oil making it heavier. Thereafter the exhaust gasses and oil are pushed upward through the horizontal exhaust gas opening 50 into the first upper chamber 44 after reversing direction 180°. It is believed that this helps to force the heavier oil coated particulate matter to drop out and to drain through the drain holes 52 back into the lower oil chamber 42.

Since the oil coated exhaust gasses also have to pass through more steel wool 56 in the first upper chamber 44 and then have to reverse direction 180° into the second upper chamber 46, more oil coated particulate will drop out and drain back into the lower oil chamber 42. The packing material 40 in the lower oil chamber will slow down the initial high pressure surges at first velocity to create turbulence of the entering exhaust gasses thereby coating more particulate matter with oil as well as aiding in keeping oil in the lower chamber.

An experimental test model of the invention as hereinbefore described was tested by an Environmental Consultant in Denver, Colorado and the summary of the results of the vehicle exhaust emission for carbon dioxide ($CO_2$), oxygen ($O_2$) and carbon monoxide (CO) are shown below. In the first test of a standard internal combustion engine with a muffler 96 attached thereto, but without the applicant's device 10, the results of three trials were as follows:

| Percent by Volume | $CO_2$ | $O_2$ | CO |
|---|---|---|---|
| Trial #1 | 13.1 | 1.5 | 1.2 |
| Trial #2 | 13.2 | 1.4 | 1.2 |
| Trial #3 | 13.3 | 1.4 | 1.1 |
| Average | 13.2 | 1.45 | 1.17 |

After installing the test device 10 to the muffler 96 the results were as follows after three trials:

| Percent by Volume | $CO_2$ | $O_2$ | CO |
|---|---|---|---|
| Trial #1 | 12.6 | 1.8 | 0.5 |
| Trial #2 | 12.3 | 2.6 | 0.2 |
| Trial #3 | 12.4 | 2.7 | 0.5 |
| Average | 12.38 | 2.40 | 0.43 |

The above tests were conducted using EPA Reference Method 3. A sample was collected from the tailpipe exhaust 100 of the test internal combustion vehicle. A Hays Orsat Analyzer was utilized to measure the percent by volume concentrations.

It can be seen from the above test results that the applicant's new and novel air pollution device 10 lowered the $CO_2$ significantly and also lowered the CO dramatically from 1.17 to 0.43, an amount over 50%. In addition it can be seen that the amount of beneficial $O_2$ emitted out of the applicant's device 10 increased from 1.45 to 2.40, meaning more oxygen is added to the outside air from the applicant's device.

In conducting the above tests, the initial model tested had a plurality of oil drain holes in the entire width of the generally horizontal plate 45, not as shown in FIG. 7. In other words, oil drain holes 52 were in the generally horizontal plate 45 in both the upper chambers 44 and 46.

The applicant's novel device has since then been modified to eliminate the oil drain holes 52 in the generally horizontal plate 45 in the second upper chamber 46 to conform to the structure shown in FIGS. 1-11. It is believed that this modification thereby greatly improves the performance of the applicant's device since it is believed that the first tested version allowed exhaust gasses to escape upwardly through the oil drain holes 52 directly into the second upper chamber 46. Further tests to prove that the before mentioned modification will greatly improve the performance of the applicant's device will be described hereinafter.

While the liquid used in the device is oil in the preferred embodiment, other liquids may be used which perform the same function within the spirit and scope of the invention. In addition while it is believed that a 20 weight oil would be preferable, it may be needed to use a lighter weight oil in colder areas to aid the functioning of the device. The oil should be drained at least every time the engine crankcase oil is drained such as once a month and may be drained sooner or longer as needed, depending on the amount of driving and the age of the automotive internal combustion engine.

Referring now to FIGS. 15 and 16 there are shown cross-sectional views taken along lines 6—6 and 7—7 respectively of FIG. 1 of a modified form of the applicant's novel invention. A modified lower oil chamber is shown generally by the numeral 108 and has a series of internal baffle plates 110 welded therein which should cause turbulence in the oil filled chamber as shown by the arrows 112.

In a similar manner, the two upper chambers may be modified as generally shown by the numeral 114 to have a plurality of internal baffle plates 116 in the first upper chamber 44 and a plurality of internal baffle plates 118 in the second upper chamber 46. These modified upper chamber baffle plates 116 and 118 should cause turbulence in the chambers as shown by the arrows 120. The baffles 110, 116 and 118 thereby become turbulence creating means in this modified form of the invention.

By forming the intake pipe 14, shown in FIG. 1, curved downwardly, the oil filled in the lower oil chamber 42 will also partially fill into the intake pipe 14 since the lower oil chamber 42 is filled with oil. This then requires the incoming gasses to be forced into the oil and through the turbulence creating means 40 in the lower oil chamber 42. As a result the particulate matter in the gasses will be completely coated with oil making them heavier than they were upon entering into the chambers 42.

The oil and the oil coated particulate matter as well as the remaining gas then pass upward through the horizontal opening 50 where the turbulence causing means 56 will tend to create turbulence thereby driving the heavier oil coated particulate matter downwardly and eventually it will flow back into the lower oil chamber 42.

In the modified embodiment shown in FIGS. 15 and 16 the turbulence in the chambers may also be increased further by also adding more turbulence creating means such as the before described plastic netting material 40 and the steel wool 56 to thereby create a much improved basic device.

While the preferred embodiment herein described has been designed to be used with an existing internal combustion engine muffler, it is within the spirit and scope of the invention that the applicant's basic device may be further modified to act as a muffler and air pollution device within the spirit and scope of the invention.

As before mentioned, the previous tests conducted by an Environmental Consultant in Denver, Colorado, were conducted on a model of the device which had a plurality of oil drain holes in the entire width of the generally horizontal plate 45. By modifying the novel device to eliminate the oil drain holes 52 in the generally horizontal plate 45 in the second upper chamber 46 to conform to the structure shown in FIGS. 1-11, the foregoing test results were obtained. These tests were conducted on a 1975 Chevrolet, 6 cylinder, one-half ton pickup truck and on a 1976 Dodge, two-door, V-8 sedan by licensed inspectors under the State of Colorado's A.I.R. program for vehicular emissions. The vehicles were first tested with a standard muffler and then with the applicant's device installed downstream of the standard muffler as shown in FIG. 14. The impressive results were as follows:

| | Tailpipe Emissions Inspection | | |
|---|---|---|---|
| | Colorado Standard | At Idle Measured | At 2500 RPM Measured |
| 1975 Chevrolet Pickup Truck With Standard Muffler (Test #2324060) | | | |
| CO% | 4.40 | 0.09 | 1.31 |
| HC ppm | 800 | 375 | 65 |
| 1975 Chevrolet Pickup Truck With Applicant's Device Installed Downstream of Muffler (Test #2324061) | | | |
| CO% | 4.40 | 0.03 | 0.61 |
| HC ppm | 800 | 262 | 64 |

The tests on the 1976 Dodge sedan were equally impressive as shown below:

| | 1976 Dodge Sedan With Standard Muffler (Test #2324088) | | |
|---|---|---|---|
| CO% | 4.40 | 0.49 | 1.83 |
| HC ppm | 800 | 513 | 365 |
| 1976 Dodge Sedan With Applicant's Device Installed Downstream of Muffler (Test #2324089) | | | |
| CO% | 4.40 | 0.28 | 1.82 |
| HC ppm | 800 | 406 | 303 |

From these tests, it is apparent that the applicant's new and novel device performs to dramatically reduce the percentage of CO in a vehicle emission system and also the parts per million (ppm) of hydrocarbons (HC) in the tailpipe of the vehicle. As a result, the use of the applicant's device should be very helpful in reducing air pollution, especially around large cities having heavy concentrations of automotive vehicles.

From the foregoing it can be seen that the applicant's new and novel device accomplishes all of the objects and advantages presented hereinbefore. Nevertheless it is within the spirit and scope of the invention that other changes in the applicant's basic device may be made and the preferred embodiment shown and described herein has only been given by way of illustration.

Having described my invention, I claim:

1. An air pollution prevention device for use with internal combustion engines having an exhaust gas system with a plurality of pipes along with at least one muffler, comprising:
   a. an elongated container for mounting downstream from the muffler, the container having formed therein at least three inner connecting chambers with two upper chambers being positioned over a lower chamber, the chambers serving to control the direction of exhaust gasses flowing through the device.
      (1) a filler plug, fixedly attached to the container, for filling liquid to coat particulate matter in the exhaust gas,
      (2) a drain plug, fixedly attached to the container, for draining liquid and coated particulate matter in the exhaust gas out of the container,
      (3) an intake pipe and an exhaust pipe, fixedly attached to the container and opening into the inside of the container into the chambers, the intake pipe opening into the lower chamber and the exhaust pipe opening into one of the upper chambers;
   b. a turbulence creating means, being positioned inside the lower chamber and the upper chambers, the turbulence means serving to increase turbulence of the exhaust gas inside the container and also serving to prevent liquid from escaping from the container whenever the internal combustion engine is running;
   c. the inner connecting chambers being designed so that exhaust gas enters into the lower chamber and passes through the turbulence means, and the liquid and then passes upwardly into one of the upper chambers and reverses direction to pass through more turbulence means, the exhaust gas then passes into the other of the upper chambers by again reversing direction to pass through more turbulence means and out of the container through the exhaust pipe; and
   d. the inner connecting chambers being designed so that particulate matter coated with the liquid will not pass out the exhaust pipe and will run downwardly into the lower chamber where it can be periodically removed by draining it from the lower chamber by removing the drain plug.

2. The device as defined in claim 1 further comprising at least a portion of one of the upper chambers having formed therein a plurality of liquid drain holes for draining particulate matter coated with the liquid into the lower chamber.

3. The device as defined in claim 1 further comprising the turbulence creating means comprising a predetermined quantity of packing material.

4. The device as defined in claim 1 further comprising the turbulence creating means comprising steel wool being positioned in at least one of the upper chambers and further comprising plastic netting material being positioned in the lower chamber.

5. The device as defined in claim 4 further comprising the liquid comprising oil.

6. The device as defined in claim 1 further comprising the inside of the elongated container including the three inner connecting chambers being coated with teflon to prevent the liquid and exhaust gasses from corroding the elongated container.

7. The device as defined in claim 1 further comprising the turbulence creating means comprising a plurality of inner baffles being fixedly attached in predetermined positions to the three inner connecting chambers.

8. An air pollution prevention device for use with internal combustion engines having an exhaust gas system with a plurality of pipes, comprising:
   a. an elongated container for mounting in the exhaust gas system, the container having fixedly attached thereto an intake pipe opening into the container, the intake pipe being designed to be attached to one of the pipes of the exhaust system, the container also having fixedly attached thereto an exhaust pipe opening into the container;
   b. a generally horizontal plate, fixedly attached to the container and positioned inside the container to divide the container into at least one lower chamber and at least one upper chamber area, the horizontal plate being positioned above the intake pipe opening:
      (1) a plurality of oil drain openings being formed in at least a portion of the horizontal plate,
      (2) an exhaust gas opening also being formed on one end of the horizontal plate opposite to the intake pipe opening, the exhaust gas opening permitting exhaust gas to pass from the lower chamber to the upper chamber area;
   c. a generally vertical central partition baffle fixedly attached to the container on the inside of the container, the baffle also being fixedly attached to the horizontal plate to divide the upper chamber area into at least two connecting chambers;
      (1) an opening being formed in the baffle to permit exhaust gas to pass from one of the connecting chambers into the other connecting chamber;
      (2) the baffle being positioned approximately in the central portion of the upper chamber area,
      (3) the exhaust pipe opening being positioned in one of the connecting chambers;
   d. oil filler means, fixedly attached to one of the connecting chambers, for filling a predetermined amount of oil into the container;
   e. oil drain means, fixedly attached to the lower chamber, for draining the oil from the lower chamber at predetermined times:
   f. a turbulence creating means, being positioned inside the lower chamber and the upper connecting chambers, the turbulence means serving to increase turbulence of the exhaust gas inside the container and also serving to prevent oil from escaping from the device whenever the internal combustion engine is running;
   g. a predetermined amount of oil being positioned inside the container in the lower chamber; and
   h. the oil functioning to coat particulate matter in the exhaust gas with oil to make it heavier so that it will remain in the container and not pass out of the container, the turbulence means functioning to cause turbulence in the exhaust gas in combination with the three chambers to cause the oil coated particulate matter to drop out of the exhaust gas and to flow into the lower chamber where it can be removed at predetermined times.

9. The device as defined in claim 8 further comprising at least a portion of the generally horizontal plate having formed therein a plurality of oil drain holes for draining particulate matter coated with oil from one of the upper chambers into the lower chamber.

10. The device as defined in claim 9 further comprising the generally vertical central partition baffle having formed in the lower portion thereof a plurality of oil drain notches for draining particulate matter coated with oil from one of the upper chambers into the other of the upper chambers and then into the lower chamber.

11. The device as defined in claim 10 further comprising the generally horizontal plate being positioned with a slight downward slope from a higher level at the intake pipe to a lower level at the end of the container opposite to the intake pipe to aid in draining oil into the lower chamber.

12. The device as defined in claim 8 further comprising the turbulence creating means comprising a predetermined quantity of packing material.

13. The device as defined in claim 12 further comprising the turbulence creating means comprising steel wool being positioned in at least one of the upper chambers and further comprising plastic netting material being positioned in the lower chamber.

14. The device as defined in claim 8 further comprising the inside of the elongated container including the lower chamber and the upper chamber area being coated with teflon to prevent the oil and exhaust gasses from corroding the elongated container.

15. The device as defined in claim 8 further comprising the turbulence creating means comprising a plurality of inner baffles being fixedly attached in predetermined positions to the three inner connecting chambers.

16. A method of removing pollution-causing matter from exhaust gasses of an internal combustion engine having a muffler, comprising the steps of:
   a. providing a pollution prevention device having at least three chambers for reversing the direction of the exhaust gasses at least two times, the chambers containing turbulence means to cause turbulence in the exhaust gasses as they pass through the chambers;
   b. providing the pollution prevention device with a liquid contained in at least one of the chambers for coating particulate matter in the exhaust gasses with the liquid;
   c. installing the pollution prevention device downstream from the internal combustion engine's muffler;
   d. running the internal combustion engine;
   e. draining the liquid from the device at predetermined times and filling more liquid into the device as needed.

17. The method as defined in claim 16 wherein the liquid contained in at least one of the chambers for coating particulate matter is oil.

18. The method as defined in claim 16 wherein the turbulence means contained in the chambers is packing material.

19. The method as defined in claim 16 wherein the turbulence means contained in the chambers is a plurality of inner baffles fixedly attached in predetermined positions to the three chambers.

20. The method as defined in claim 16 wherein step e. is repeated each time oil in the internal combustion engine is changed.

* * * * *